US007988217B2

(12) United States Patent
Vantrease

(10) Patent No.: US 7,988,217 B2
(45) Date of Patent: Aug. 2, 2011

(54) HATCHBACK DOOR WATER MANAGEMENT BRACKETS

(75) Inventor: Steven B. Vantrease, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 165 days.

(21) Appl. No.: 12/323,022

(22) Filed: Nov. 25, 2008

(65) Prior Publication Data

US 2010/0127527 A1 May 27, 2010

(51) Int. Cl.
*B62D 25/10* (2006.01)

(52) U.S. Cl. ........................................................ 296/76

(58) Field of Classification Search .................... 296/76, 296/146.5, 146.6, 146.856, 154; 49/502
See application file for complete search history.

(56) References Cited

U.S. PATENT DOCUMENTS

| | | | | |
|---|---|---|---|---|
| 4,127,301 | A * | 11/1978 | Syrowik | 296/37.16 |
| 4,413,854 | A * | 11/1983 | Hirshberg | 296/76 |
| 4,886,312 | A | 12/1989 | Asoh | |
| 5,466,035 | A * | 11/1995 | Klages et al. | 296/205 |
| 6,000,747 | A * | 12/1999 | Sehgal et al. | 296/76 |
| 6,113,177 | A | 9/2000 | Parkinson | |
| 6,385,925 | B1 * | 5/2002 | Wark | 49/408 |
| 6,431,638 | B1 * | 8/2002 | Mrozowski et al. | 296/146.8 |
| 6,976,338 | B2 | 12/2005 | Olk et al. | |
| 7,537,267 | B2 * | 5/2009 | Tanaka et al. | 296/146.8 |
| 2005/0264030 | A1 | 12/2005 | Gervasi | |

FOREIGN PATENT DOCUMENTS

| | | |
|---|---|---|
| DE | 3910257 | 3/1990 |
| DE | 4302547 | 3/1994 |
| EP | 0483758 | 6/1992 |
| JP | 60219120 | 11/1985 |

* cited by examiner

*Primary Examiner* — Kiran B. Patel
(74) *Attorney, Agent, or Firm* — Dinsmore & Shohl LLP

(57) ABSTRACT

A water management bracket includes a first angled portion with first interior surface, a second angled portion with second interior surface and a body portion with body interior surface. The first angled portion may be disposed between the body and second angled portions and oriented at an angle with respect to the body portion such that a normal to the first interior surface may be co-planar with a normal to the body interior surface. The second angled portion may be oriented at an angle with respect to the first angled portion and rotated away from the first angled portion such that a normal to the second interior surface is non-coplanar with the normals of the first and third interior surfaces, wherein, when the hatchback door assembly is open, the body interior surface may receive water flowing along the hatchback door assembly, and divert it away from a vehicle interior vehicle.

8 Claims, 2 Drawing Sheets

HATCHBACK DOOR WATER MANAGEMENT BRACKETS

TECHNICAL FIELD

The present invention generally relates to hatchback door assemblies for vehicles and, more specifically, to brackets for hatchback doors which divert water from the interior of the vehicle.

BACKGROUND

Generally, automotive hatchbacks provide users with access to a vehicle interior. Distinct from typical trunks, hatchback door assemblies are hinged proximate a vehicle's roof and latched proximate a vehicle's bumper thereby allowing an extended entryway spanning from the roof to the bumper. Weather strips may be disposed around the circumference of the hatchback door to seal the hatchback door and prevent water from entering the vehicle when the hatchback door is closed. Unfortunately, water often collects on the exterior of the hatchback door from rain, condensation and the like. As the hatchback door is opened and the hatchback door tilts towards vertical, the collected water droplets roll across the surface of the hatchback door toward the hinged top and/or the curved sides. The water may flow along the edge of the hatchback door and/or the weather strip and into the interior of the vehicles.

Further, some automotive hatchbacks feature power door assemblies that automatically close and secure the hatchback door at the push of a button. While the convenience benefits the user, the additional technology brings unintended consequences. Water collected on the door exterior may flow along the power strips and into the interior of the vehicle.

Accordingly, a need exists for an alternative apparatus for preventing water from entering a vehicle through a hatchback door opening as the hatchback door is either raised or opened.

SUMMARY

In one embodiment, a water management bracket for a hatchback door assembly of a hatchback vehicle includes a first angled portion including a first interior surface, a second angled portion including a second interior surface and a body portion including a body interior surface. The first angled portion may be disposed between the body portion and the second angled portion. The first angled portion may also be oriented at an angle with respect to the body portion such that a normal to the first interior surface may be co-planar with a normal to the body interior surface. The second angled portion may be oriented at an angle with respect to the first angled portion, and the second angled portion may be rotated away from the first angled portion such that a normal to the second interior surface is non-coplanar with the normal to the first interior surface, and the normal to the body interior surface. When the hatchback door assembly is open, the body interior surface may be operable to receive water flowing along the hatchback door assembly, and the first interior surface, the second interior surface and the body interior surface may be operable to divert the water away from an interior of the vehicle.

In another embodiment, a water management bracket for a hatchback door assembly of a hatchback vehicle includes a first angled portion including a first interior surface, a second angled portion including a second interior surface, a body portion including a body interior surface, a first snap and a second snap. The first angled portion may be disposed between the body portion and the second angled portion. The first angled portion may also be oriented at an angle with respect to the body portion such that a normal to the first interior surface may be co-planar with a normal to the body interior surface. The second angled portion may be oriented at an angle with respect to the first angled portion, and the second angled portion may be rotated away from the first angled portion such that a normal to the second interior surface is non-coplanar with the normal to the first interior surface, and the normal to the body interior surface, wherein, when the hatchback door assembly is open, the body interior surface may be operable to receive water flowing along the hatchback door assembly, and the first interior surface, the second interior surface and the body interior surface may be operable to divert the water away from an interior of the vehicle. The first snap and second snap may extend from the body portion and be capable of attaching the water management bracket to the hatchback door assembly.

In yet another embodiment, a vehicle having a hatchback door with a power hatchback door sensing strip includes a roof end, a bumper end and a water management bracket. The roof end may be disposed above the bumper end when the hatchback door is in an open position and the roof end may be disposed below the bumper end when the hatchback door is in a closed position. The water management bracket may be attached to the power hatchback door sensing strip proximate the roof end and may be operable to divert water away from the power hatchback door sensing strip when the hatchback door is in the open position.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 4:
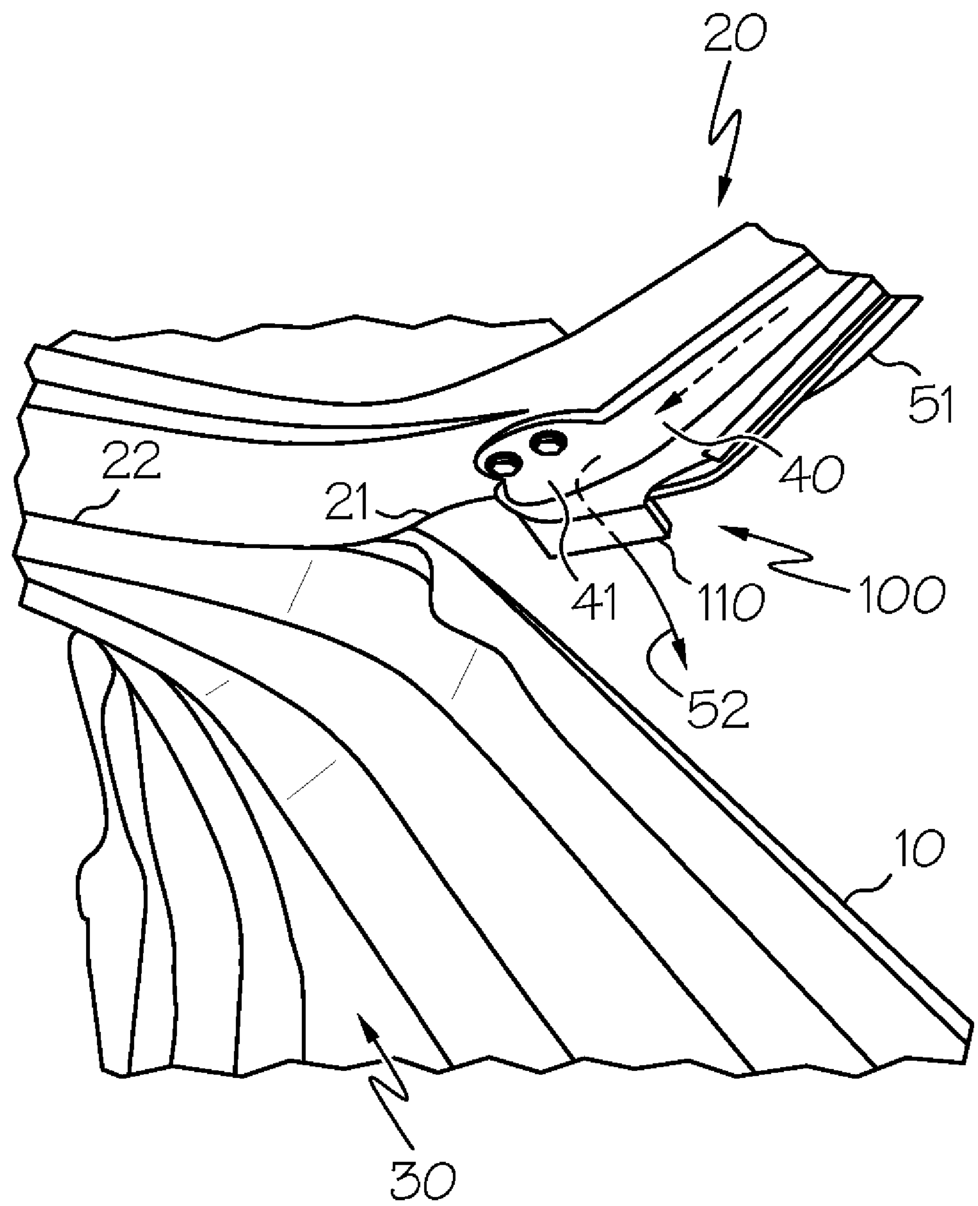
FIG. 4 depicts an automotive hatchback with an open power hatchback door assembly and a power hatchback door sensing strip including the water management bracket of FIG. 1 according to one or more embodiments shown and described herein.

FIG. 4 generally depicts one embodiment of a water management bracket attached to a power hatchback door sensing strip on a power hatchback door assembly for an automotive hatchback. The water management bracket generally attaches to a power hatchback door sensing strip proximate the power hatchback door assembly's hinged connection with the vehicle. As the hatchback door assembly moves to a substantially open position, the water management bracket receives water running down the power hatchback door sensing strip and deflects it away from the interior of the vehicle. Various embodiments of the water management bracket and the application of the water management bracket will be described in more detail herein.

Figure 1:
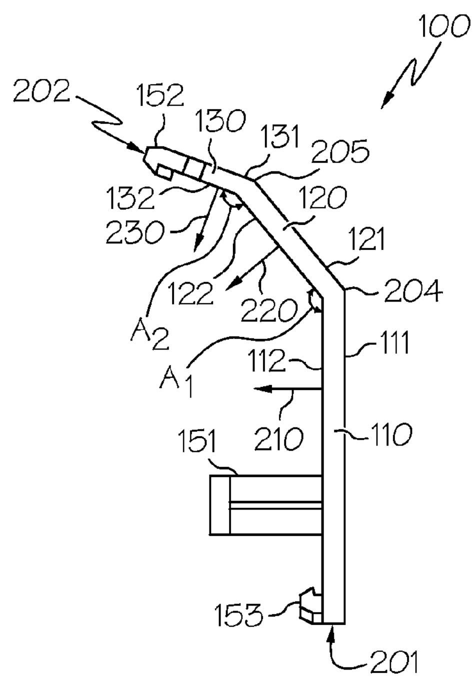
FIG. 1 depicts a side view of a water management bracket according to one or more embodiments shown and described herein.
Figure 2:
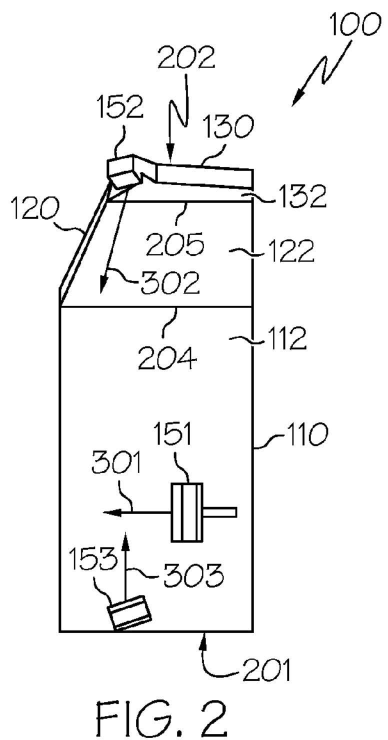
FIG. 2 depicts a top view of the water management bracket of FIG. 1 according to one or more embodiments shown and described herein.

Referring now to FIG. 1 and FIG. 2, a water management bracket 100 comprises three sections extending from a first end 201 to a second end 202. A body portion 110 has an exterior surface 111 and a body interior surface 112 opposite the exterior surface 111. The first end 201 of the water management bracket 100 is proximate one end of the body portion 110. Further more, in one exemplary embodiment, the body portion is generally a thin, flat section, longer than it is wide.

A first angled portion 120 extends from an end 204 of the body portion 110 opposite the first end 201. The first angled portion 120 comprises an exterior surface 121 and a first interior surface 122 opposite the exterior surface 121. The first angled portion 120 is oriented at a first angle $A_1$ with respect to the body portion 110 such that a normal 220 to the first interior surface 122 is co-planar with a normal 210 to the body interior surface 112. Due to the angular orientation of the body portion 110 and the first angled portion 120, the normals 210,220 to each surface 112, 122 converge. While FIG. 1 and FIG. 2 illustrate a distinct angle between the body portion 110 and first angled portion 120, in alternative embodiments the transition between the first angled portion 120 and body portion 110 may be continuous, such as a smooth curve from one to the other. Furthermore, the body portion 110 and the first angled portion 120 are integral such as when the body portion 110 and the first angled portion 120 are one piece. Alternatively, the body portion 110 and the first angled portion 120 may comprise independent pieces secured together such as by adhesives, screws, snaps, latches, and the like. In one exemplary embodiment, the first angled portion 120 may be a generally thin flat section having a thickness similar to that of the body portion 110.

A second angled portion 130 extends from an end 205 of the first angled portion 120 opposite the end 204 of the body portion 110. The second angled portion 130 comprises an exterior surface 131 and a second interior surface 132 opposite the exterior surface 131. The second angled portion 130 is oriented at a second angle $A_2$ with respect to the first angled portion 120. Furthermore, the second angled portion 130 is rotated away from the first angled portion 120 such that a normal 230 to the second interior surface 132 is non-coplanar with the normal 220 to the first interior surface 122 and the normal 210 to the body interior surface 112. The specific direction of rotation may depend on the environment in which the water management bracket is employed.

While FIG. 1 and FIG. 2 illustrate a distinct second angle $A_2$ between the second angled portion 130 and first angled portion 120, it should be understood that the transition between the second angled portion 130 and first angled portion 120 may be continuous such as a smooth curve from one to the other. Furthermore, the second angled portion 130 and first angled portion 120 may be integral such as when the second angled portion 130 and first angled portion 120 are one piece, or comprise independent pieces secured together by adhesives, screws, snaps, latches, and the like. In one exemplary embodiment, the second angled portion 130 is generally a thin flat section comprising a thickness similar to that of the body portion 110 and/or the first angled portion 120.

While FIG. 1 and FIG. 2 show the second angled portion 130 being twisted or rotated relative to the first angled portion 120, it should be understood that each section of the bracket 100 may have a twist or rotation relative to the other sections such that the normals (i.e., 210, 220 and 230) to each interior surface (i.e., 112, 122 and 132) are non-coplanar with each other. Furthermore, the second angled portion 130 may not be angled relative to the first angled portion 120. Accordingly, it should be understood that the change in directions of the water management bracket 100 between the first end 201 and the second end 202 may be distributed throughout the portions of the water management bracket 100 yielding a water management bracket 100 having a similar shape as depicted in FIGS. 1 and 2.

In one embodiment, the water management bracket 100 may further comprise one or more snaps which facilitate attachment of the bracket to another component. The snaps may be in the form of a J-hook connection or other similar connectors that may be used to secure the water management bracket to another component. The snaps may be integral with the water management bracket such as when the snaps are molded with the water management bracket, or may be attached by adhesives, welding or the like.

Figure 3:
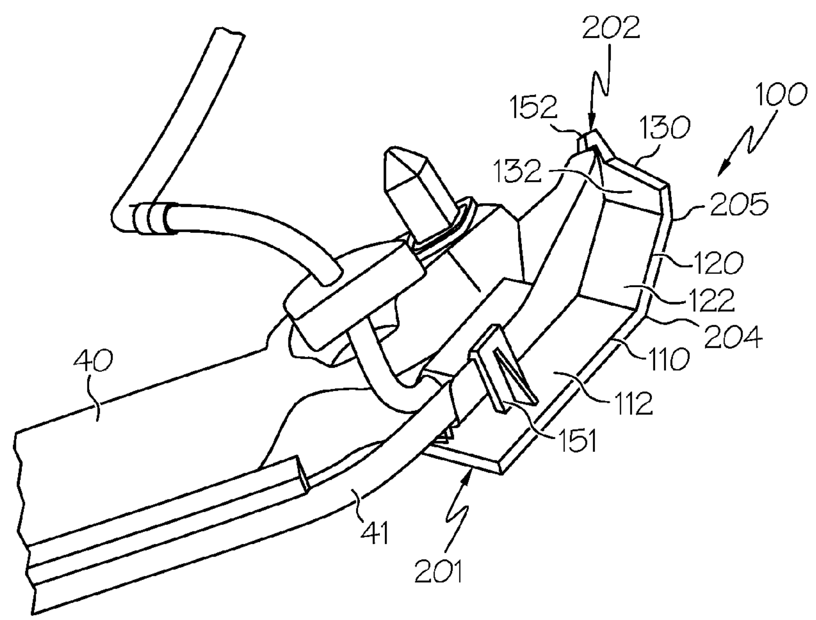
FIG. 3 depicts a power back door sensing strip with the water management bracket of FIG. 1 according to one or more embodiments shown and described herein.

In one embodiment, such as that illustrated in FIGS. 1-3, three integral snaps 151, 152 and 153 are disposed about the water management bracket. A first snap 151 is disposed on the body interior surface 112 of the body portion 110 and face a first direction 301. Facing a direction as used herein is defined as the direction in which the snap makes contact with the part to which the bracket is to be secured. A second snap 152 faces a second direction 302 and is disposed about the second angled portion 130 proximate the second end 202 of the water management bracket 100. In one embodiment, the second direction 302 generally faces a direction different than the first direction 301 so that the first snap 151 restricts longitudinal movement in one direction and the second snap 152 restricts latitudinal movement in another direction. An anchor snap 153 faces a third direction 303 and extends from the body portion 110 proximate the first end 201 of the water management bracket 100. In one embodiment, the third direction 303 is generally in a direction different than the first direction 301 and second direction 302 so that the first, second and third directions enable the first, second and third snaps 151, 152 and 153 to secure the water management bracket 100. In one embodiment, the first, second and third directions 301, 302 and 303 generally converge.

While FIG. 1 generally depicts three snaps, it should be understood that the water management bracket 100 may comprise one or two snaps or more than three snaps. In the alternative, the three snaps may be disposed elsewhere about the water management bracket. Furthermore, attachment may be accomplished by adhesives, screws, bolts, heat stakes and the like. Alternatively, the water management bracket may comprise one or more complimentary connectors for receiving snaps, latches, heat stakes or the like.

The water management bracket may be made from a variety of materials. In one exemplary embodiment, the water management bracket may be made of polypropylene or thermoplastic polymer and manufactured through an injection molding process. Such a material limits water absorption by the bracket and allows water to flow over and be diverted by the bracket. The bracket may comprise hydrophobic materials, or those having a tendency to repel water to ensure that water flow leaves the water management bracket. In another exemplary embodiment, the water management bracket may comprise a first material while the interior surfaces may be coated with a second material. For example, it may be beneficial for the water management bracket to generally comprise a porous material while the interior surfaces comprise a hydrophobic material. Such an embodiment may limit material requirements while still providing a solid surface for water flow. Alternatively, steels, rubbers or other materials may be used to construct the water management bracket.

Referring now to FIG. 3, the water management bracket 100 may be attached to a power hatchback door sensing strip 40 or at an outside edge 41 of the power hatchback door sensing strip 40. When attached to the outside edge 41 of the power hatchback door sensing strip 40, the body interior surface 112, the first interior surface 122 and the second interior surface 132 generally conform to the contours of the outside edge 41 of the power hatchback door sensing strip 40. The second angled portion 130 of the water management bracket 100 is proximate the end of the power hatchback door sensing strip 40 (as illustrated in FIG. 3). However, in an alternative embodiment, the second angled portion 130 of the water management bracket 100 may extend past the end of the power hatchback door sensing strip 40. In the alternative, the second angled portion 130 may terminate prior to the end of the power hatchback door sensing strip 40. In another exemplary embodiment, the water management bracket may seamlessly transition from the outside edge 41 of the power hatchback door sensing strip 40 with little or no overlap between the two. In such an embodiment, the water management bracket 100 may be integral with the power hatchback door sensing strip 40 so as to comprise one unitary piece, or the meeting of the outside edge 41 of the power hatchback door sensing strip 40 and the water management bracket 100 comprises a smooth curved transition.

Referring to FIG. 3, the water management bracket 100 maybe attached to the power hatchback door sensing strip 40 with snaps 151, 152 and 153. Generally, the first snap 151, the second snap 152 and the anchor snap 153 may secure the water management bracket 100 in three locations. The snaps 151, 152 and 153 may extend from the water management bracket 100 and attach to the outside edge 41 of the power hatchback door sensing strip 40 so that the end of the snap, or the J-hook portion, contacts the opposite side of the outside edge 41 of the power hatchback door sensing strip 40. By securing the water management bracket 100 to the power hatchback door sensing strip 40 in three locations, the water management bracket 100 may be rigidly secured to the power hatchback door sensing strip 40.

While FIG. 3 shows the water management bracket 100 as being attached to the power hatchback door sensing strip 40 with snaps 151, 152 and 153, it should be understood that alternative methods of attachment may be used. One such alternative is the use of double sided tape or an adhesive disposed between the water management bracket 100 and the power back door sensing strip 40. The adhesive may be disposed along the body interior surface 112 of the body portion 110 and/or the first interior surface 122 of the first angled portion 120. Alternatively, a heat stake may be employed so that the water management bracket 100 comprises a plastic extension that may slide through a hole in the power hatchback door sensing strip 40.

Referring to FIG. 3 and FIG. 4, a hatchback door assembly 20 for a hatchback vehicle 10 comprises a power hatchback door sensing strip 40 attached to an edge 21 of the hatchback door 51. The water management bracket 100 is attached to the power hatchback door sensing strip 40 as described herein. The hatchback door 51 comprises a first portion 22, or roof end, adjacent the roof of the hatchback vehicle 10. The hatchback door 51 further comprises a second portion (not shown), or bumper end, that rests adjacent the bumper when the hatchback door 51 is in the closed position. When the hatchback door 51 is moved to an open position, the second portion moves vertically so that the second portion is disposed above or at a similar height as the first portion 22.

The power hatchback door sensing strip 40 may be positioned on an edge 21 of the hatchback door 51 and may extend substantially the entire length of the edge 21 of the hatchback door 51. In one exemplary embodiment, the water management bracket 100 is attached to the outside edge 41 of the power hatchback door sensing strip 40 proximate the first portion 22 of the hatchback door 51 or where the hatchback door 51 is connected to the hatchback vehicle 10. When the hatchback door 51 is in a substantially closed position (not shown), the second angled portion 130 may be disposed above the first angled portion 120 which may further be disposed above the body portion 110. When the hatchback door 51 is in a substantially open position, the water management bracket 100 may move with the hatchback door 51 so that the body portion 110 is substantially level with or disposed above the first angled portion 120 and second angled portion 130 so that the interior surfaces (i.e., first interior surface 122 and second interior surface 132) may generally form a downward slope.

When the hatchback door assembly 20 (comprising the hatchback door 51 and the power hatchback door sensing strip 40) is moved to a substantially open position, water 52 (depicted by dashed and solid lines in FIG. 4) flows along the edge 21 of the hatchback door 51 and along the power hatchback door sensing strip 40 and onto the body interior surface 112 of the body portion 110 of the water management bracket 100 as indicated by the dashed lines in FIG. 4. The water management bracket 100 diverts the water 52 flow away from the interior 30 of the hatchback vehicle 10. More specifically, as water 52 flows down the power hatchback door sensing strip 40, it flows across the body interior surface 112 of the body portion 110, onto the first interior surface 122 of the first angled portion 120 and over the second interior surface 132 of the second angled portion 130 where the water 52 is diverted away from the interior 30 of the hatchback vehicle 10 before leaving the hatchback door assembly 20. The orientation of the first angled portion 120 and second angled portion 130 allows the water 52 to exit or drip in a direction away from the interior 30 of the hatchback vehicle 10 thereby keeping the interior 30 of the hatchback vehicle 10 dry when the hatchback door assembly 20 is opened.

It should be understood that the hatchback door assembly may comprise two power back door sensing strips disposed along opposed edges of the hatchback back door. Where the power back door sensing strips are on opposite sides of the hatchback door, the water management brackets may be attached to the power hatchback door sensing strips such that water flowing over the water management brackets will be deflected in opposite directions so that the water flows toward the side of the vehicle in which it is closest.

While embodiments shown herein show the water management bracket attached to power hatchback door sensing strips, hatchback door assemblies may include various other components that a water management bracket may attach to. Similarly, the water management bracket may attach directly to the hatchback door assembly, while still retaining the same functionality of diverting water away from the interior of the vehicle.

It should now be understood that the water management bracket of the present invention may be used in conjunction with a power hatchback door sensing strip on a hatchback vehicle to deflect water away from the interior of the vehicle when the hatchback door is moved to an open position.

For the purposes of describing and defining the present invention it is noted that the terms "substantially" and "about"

are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A water management bracket for a hatchback door assembly of a hatchback vehicle comprises a first angled portion comprising a first interior surface, a second angled portion comprising a second interior surface and a body portion comprising a body interior surface, wherein:

the first angled portion is disposed between the body portion and the second angled portion;

the first angled portion is oriented at a first angle with respect to the body portion such that a normal to the first interior surface is co-planar with a normal to the body interior surface; and the second angled portion is oriented at a second angle with respect to the first angled portion, and the second angled portion is rotated away from the first angled portion such that a normal to the second interior surface is non-coplanar with the normal to the first interior surface, and the normal to the body interior surface, wherein, when the water management bracket is attached to the hatchback door assembly and the hatchback door assembly is open, the body interior surface receives water flowing along the hatchback door assembly, and the first interior surface, the second interior surface and the body interior surface divert the water away from an interior of the vehicle.

2. The water management bracket of claim 1 wherein the hatchback door assembly comprises a power hatchback door sensing strip extending along an edge of the hatchback door assembly and the water management bracket is attached to the power hatchback door sensing strip.

3. The water management bracket of claim 1 wherein the water management bracket comprises a plurality of snaps for attaching the water management bracket to a power hatchback door sensing strip.

4. The water management bracket of claim 3 wherein the plurality of snaps comprises a first snap facing a first direction, a second snap facing a second direction, and an anchor snap facing a third direction.

5. The water management bracket of claim 4 wherein the first snap and the second snap are substantially perpendicular to the water management bracket.

6. The water management bracket of claim 4 wherein the first direction, the second direction and the third direction converge.

7. The water management bracket of claim 1 wherein the water management bracket comprises polypropylene.

8. The water management bracket of claim l where the first interior surface, second interior surface and body interior surface comprise a hydrophobic material.

* * * * *